United States Patent [19]
Rodgers

[11] 3,827,669
[45] Aug. 6, 1974

[54] REMOTE CONTROL HYDRAULIC VALVE
[76] Inventor: Fletcher Rodgers, Alva, Okla.
[22] Filed: May 7, 1973
[21] Appl. No.: 358,159

[52] U.S. Cl. .................. 251/62, 60/DIG. 2, 285/105
[51] Int. Cl. .......................................... F16k 31/143
[58] Field of Search .................. 251/62; 60/DIG. 2; 285/105

[56] References Cited
UNITED STATES PATENTS
| | | | |
|---|---|---|---|
| 2,505,810 | 5/1950 | Svenson | 251/62 X |
| 3,424,260 | 1/1969 | Stone et al. | 60/DIG. 2 |
| 3,435,614 | 4/1969 | Ledeen et al. | 60/DIG. 2 |

*Primary Examiner*—Henry T. Klinksiek
*Attorney, Agent, or Firm*—William S. Dorman

[57] ABSTRACT

A device adapted to be installed in a pipe line, or the like, at a remote site and operated by remote control for selectively closing the pipe line for interrupting the flow of fluid therethrough. The device comprises a valve interposed in the pipe line and having a valve stem responsive to hydraulic pressure for alternately opening and closing the valve. The flow of hydraulic fluid is controlled by a motor which may be actuated from a main site whereby the hydraulic fluid may be directed to the valve stem in one direction for closing of the valve, and in a reverse direction for opening of the valve.

6 Claims, 2 Drawing Figures

REMOTE CONTROL HYDRAULIC VALVE

BACKGROUND OF THE INVENTION

1. Field of the Invention

This invention relates to improvements in valves and more particularly, but not by way of limitation, to a remote control hydraulic valve interposed in a pipe line for selectively closing the pipe line for precluding the flow of fluid therethrough.

2. Description of the Prior Art

It is frequently desirable to shut down a pipe line for selectively interrupting the flow of fluid therethrough. As a consequence, it is the usual practice to install valves at preselected intervals in the pipe line in order to close the pipe line as desired. Since pipe lines normally extend across many miles of terrain, and are often disposed in relatively inaccessible places, or remote sites wherein it may be difficult to maintain any constant or frequent manual attendance for operation of the valves. Thus, the opening and closing of the valves for the selective shutting down of the pipe line is frequently a problem.

SUMMARY OF THE INVENTION

The present invention contemplates a device adapted to be installed in a pipe line at substantially any desired remote site and which may be operated by remote control from a main station or service area. The device comprises a valve having a closure member disposed within the pipe line for selectively interrupting the flow of fluid therethrough. The valve closure member is carried by a valve stem which is provided with a piston head reciprocally disposed within a hydraulic fluid chamber. Means is provided for directing hydraulic fluid into the chamber for acting against one side of the piston head in order to open the valve and permit a free flow of fluid therethrough, and for alternately directing the hydraulic fluid to the opposite side of the piston head in order to close the valve and stop the flow of hydraulic fluid therethrough. The fluid control means comprises a suitable pumping apparatus driven by a suitable motor which is powered by a long life battery means, or the like, with the actuation of the motor being accomplished by remote control from a main station or main service area. The novel remote control valve device is simple and efficient in operation and economical and durable in construction.

DESCRIPTION OF THE PREFERRED EMBODIMENT

Figure 1:
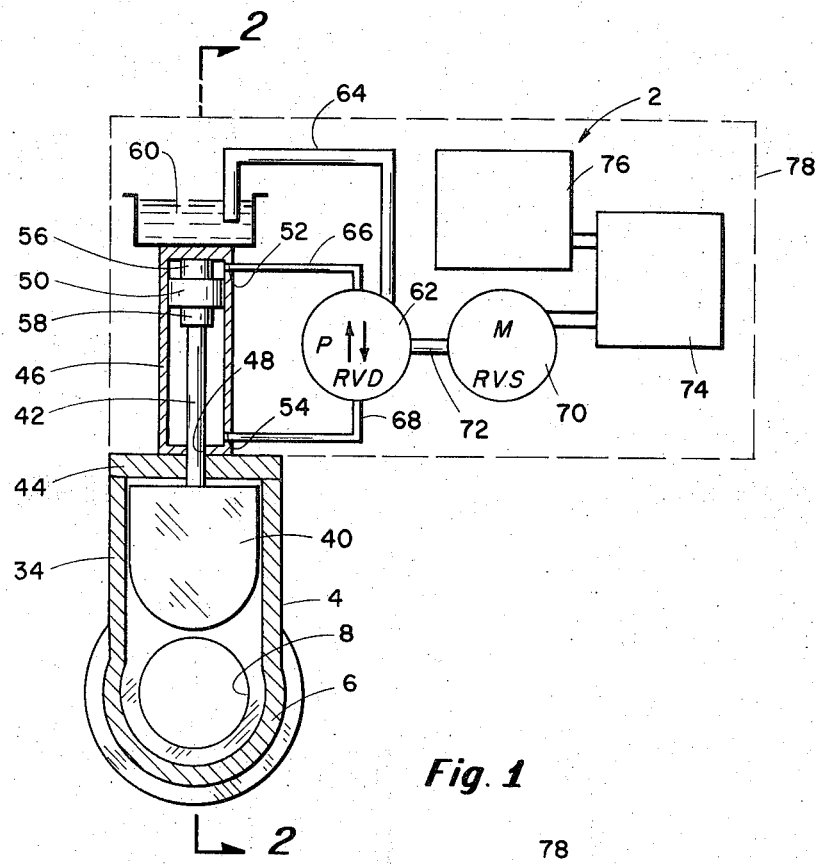
FIG. 1 is a sectional elevational view of a remote control hydraulic valve system embodying the invention with the valve depicted in section and the hydraulic control system depicted schematically.

Referring to the drawings in detail, reference character 2 generally indicates a remote control system for operation of a hydraulic valve. The valve 4 may be of any suitable type, as shown herein comprises a main body portion 6 of substantially cylindrical configuration having a central bore 8 extending longitudinally therethrough to provide a fluid passageway. Whereas the valve 4 may be interposed in a pipe line in any suitable manner, as particularly shown herein, the ends of adjacent pipe sections 10 and 12 are inserted within the opposite ends of the bore 8 for interposing the valve 4 in the pipe line. A pair of oppositely disposed longitudinally spaced annular shoulders 14 and 16 are provided in the bore 8 for receiving the pipe sections 10 and 12, respectively, thereagainst for limiting the longitudinal insertion of the pipe sections within the body 6. The bore 8 is further provided with inwardly and radially outwardly tapered portions 18 and 20 at the opposite ends thereof surrounding the pipe sections 10 and 12, respectively, as clearly shown in FIG. 2.

Each tapered portion 18 and 20 terminates in an inwardly disposed annular chamber for receiving a bladder or torus-like sealing member 22 and 24 therein, respectively. The bladders 22 and 24 are inflatable, and any suitable means as shown at 26 and 28 extends through the housing or body 6 into communication with the interior of the bladders 22 and 24, respectively, for selectively inflating thereof in order to expand the bladders into sealing engagement between the outer periphery of the pipe sections 10 and 12 and the inner periphery of the body 6. In addition, a plurality of circumferentially arranged wedge members 30 and 32 are disposed in the tapered portions 18 and 20, respectively, around the pipe sections and are in engagement with the bladders 22 and 24 in the inflated positions thereof. The inflated bladders 22 and 24 not only provide a sealing engagement between the pipe sections and the body 6, but also wedge the wedge elements 30 and 32 into a tight engagement between the pipe sections and the tapered portions 18 and 20 of the body 6 for securely retaining the pipe section in position within the body 6.

Figure 2:
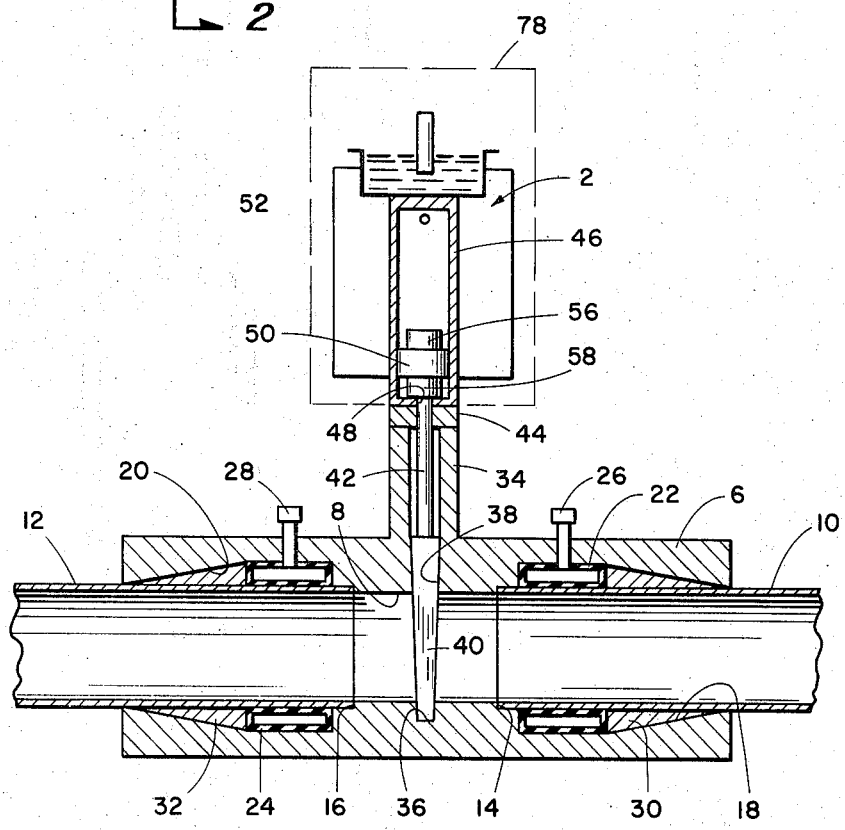
FIG. 2 is a view taken on line 2—2 of FIG. 1.

A radially outwardly extending sleeve 34 is provided on the body 6, and may either be welded thereto or integral therewith, as desired. A substantially annular recess 36 is provided in the body 6 and is in open communication at 38 with the interior of the sleeve 34. The recess 36 is preferably of a substantially wedge shaped cross-sectional configuration in a plane taken along the longitudinal axis of the body 6, as shown in FIG. 2, for a purpose as will be hereinafter set forth. A substantially slab-type gate or closure member 40 having a substantially wedge shaped cross-sectional configuration complementary to the configuration of the recess 36 is reciprocally disposed within the sleeve 34 and may be alternately lowered and raised within the sleeve 34 and in respect to the bore 8 of the body 6, as viewed in the drawings. In the lowered position of the gate 40, the gate 40 is disposed across the bore 8 for precluding passage of fluid through the valve 10. In the raised position of the gate 40 the gate 40 is removed from the bore 8 for permitting a free passage of fluid therethrough. The gate member 40 is carried by a reciprocal valve stem 42 which extends axially outwardly from the sleeve 34 through an apertured cover member 44 which may be removably secured to the outer end of the sleeve 34 in any suitable manner (not shown). In addition, suitable sealing means (not shown) is preferably interposed between the cover 44 and the sleeve 34 for precluding leakage of fluid therebetween, and further sealing means may preferably be interposed between the cover 44 and the stem 42 for precluding leakage of fluid therebetween.

A hydraulic fluid chamber or housing 46 is disposed adjacent the cover member 44 and may be secured thereto in any well known manner (not shown). The housing 46 is provided with an aperture 48 in the surface thereof adjacent the cover 44 for receiving the stem 42 therethrough. Of course, it is preferably to provide suitable sealing means (not shown) between the housing 46 and stem 42 for precluding leakage of hydraulic fluid therebetween. A suitable piston head 50 is provided on the stem 42 and reciprocally disposed within the housing 46. A first port 52 is provided in the proximity of one end of the chamber 46, and a second port 54 is provided in the proximity of the opposite end of the chamber 46. The piston head 50 is reciprocal with the chamber 46, as hereinbefore set forth. Suitable stop means 56 is provided on one end of the piston 50 for limiting the movement thereof in one direction, and second stop means 58 is provided on the opposite side of the piston 50 for limiting the movement thereof in an opposite direction.

A hydraulic fluid reservoir 60 is in communication with a suitable reversible pump 62 through a suitable conduit 64. The pump 62 is in communication with the ports 52 and 54 through suitable conduits 66 and 68, respectively. The pump 62 is operably connected with a suitable reversible motor 70 in any well known manner, as generally indicated at 72. The motor 70 is, in turn, operably connected with a suitable remote control device 74, which may be of the radio frequency control operation type. In addition, the control device 74 is operably connected with a suitable power source, such as a long life battery 76. Whereas the hydraulic fluid reservoir 60, pump 62, motor 70, control device 74 and battery 76 may be disposed as desired for the ultimate convenience, it is desirable that these elements and the hydraulic fluid cylinder 46 be suitably mounted or installed within a housing 78 (shown in dotted lines) for protection thereof.

A valve 4 and accompanying hydraulic control system 2 may be installed on a pipe line at substantially any desired location or spacing therealong in order to provide selective flow control of fluid passing through the pipe line, as is well known. The valve 4 is preferably installed between adjacent pipe sections 10 and 12 as hereinbefore set forth, and it is preferable to install the valve 4 in such a manner that the gate member 40 is in a normal open position as shown in FIG. 1. It will be apparent that suitable sealing means (not shown) may be provided between the gate 40 and the recess 36 in order to preclude leakage of fluid therebetween, or the gate member may provide a metal to metal seal with the body 6, as is well known. In order to raise the gate 40 to the open position, the pump 62 is activated in any well known manner for directing hydraulic fluid from the reservoir 60 into the chamber 46 through the port 54 below the piston head 50. The hydraulic fluid pressure acting on the lower surface of the piston head 50 urges the piston head upwardly, thus forcing any hydraulic fluid in the chamber 46 thereabove to be discharged through the port 52 and directed back into the hydraulic fluid reservoir 60. The hydraulic fluid may be retained in the chamber below the piston head 50 in the usual manner for maintaining the piston head 50 in the position shown in FIG. 2. The valve 4 may remain in this position, or until such time as it is required to close the valve for shutting down the pipe line.

As hereinbefore set forth, the valves 4 and accompanying hydraulic system 2 may be installed along the pipe line at substantially any desired spacing, and subsequent to the initial installation thereof, relatively little maintenance or manual attendance is required.

When it is desired to close the valve 4, a suitable signal, such as a radio signal, may be sent to the control system 2 from a main control center (not shown) or main control area which may be remote from the actual site of the valve 4. The control device 74 may thus be activated properly for operation of the motor 70, which in turn actuates the pump 62 for properly controlling the flow of the hydraulic fluid to and from the chamber 46. In order to close the valve 4, the pump 62 is actuated for directing the hydraulic fluid from the reservoir 60 and into the chamber 46 through the port 52 above the piston head 50, while simultaneously withdrawing the hydraulic fluid from the port 54 below the piston head 50. Of course, the hydraulic fluid pressure acting on the upper end of the piston 50 urges the piston downwardly in the chamber 46 for moving the gate 40 downwardly to the position shown in FIG. 2, thus closing the pipe line and precluding the flow of hydraulic fluid through the valve 4. The hydraulic fluid withdrawn from the lower portion of the chamber 46 may be either transferred to the upper portion thereof, or may be returned to the hydraulic fluid reservoir 60, as desired. Of course, the pressure may be maintained on the upper end of the piston 50 indefinitely, thus retaining the gate 40 in the closed position.

When it is desired to reopen the valve 4, the control device 74 may again be activated by a suitable signal from the remote control area whereby the operation of the motor 70 and the pump 62 are reversed for reversing the flow of the hydraulic fluid to and from the chamber 46 in order to raise the piston head 50, thus raising the gate 40 to the open position thereof.

Of course, it will be apparent that a suitable control panel (not shown) may be provided at the main control area having lights or other indicating devices whereby a visual inspection of the panel will disclose any malfunction at any of the valve 4 sites. When such a malfunction occurs, a suitable maintenance crew may be sent to the particular location for correcting the malfunction. Otherwise, the valves 4 may be controlled for opening and closing of the pipe line from the main control area with very little actual manual attendance at the site of the valves.

From the foregoing, it will be apparent that the present invention provides a novel valve and remote control system for selectively opening and closing of a valve installed in a pipe line at a remote location. The novel valve comprises a gate member operable by a hydraulic control system which is activated by a signal from a remote main control area whereby flow through the pipe line may be controlled with little actual manual attendance of the valve and operating system therefore.

Whereas the present invention has been described in particular relation to the drawings attached hereto, it should be understood that other and further modifications, apart from those shown or suggested herein, may be within the spirit and scope of this invention.

What is claimed is:

1. A remote control valve system for pipelines and adapted to be interposed between the ends of adjacent pipe sections of a pipeline comprising a cylindrical body having a central bore extending longitudinally therethrough to provide a fluid passageway, said bore having a pair of oppositely disposed longitudinally spaced annular shoulders, said bore being adapted to receive the ends of adjacent pipe sections therein and said shoulders limiting the longitudinal insertion of the pipe sections within said bore, said bore being provided with longitudinally inwardly and radially outwardly tapered openings therein at the opposite ends thereof surrounding the pipe sections, a plurality of circumferentially arranged wedge members disposed in the tapered openings around the pipe sections, said bore being further provided with inwardly disposed annular chambers communicating with the inner ends of said tapered openings, respectively, an inflatable torus-shaped bladder received in each annular chamber, means for inflating said bladders to provide a sealing engagement between said cylindrical body and said pipe sections and for simultaneously forcing the wedge members longitudinally outwardly into tight engagement with the pipe sections, said cylindrical body being provided with a radially outwardly extending sleeve, said body also having a wedge-shaped recess extending across the bore and communicating with the interior of said sleeve, a wedge-shaped gate member reciprocally disposed within the sleeve for vertical up-and-down movement and having a cross-sectional configuration complementary to the configuration of the wedge-shaped recess, said gate in its lowered position being disposed in said wedge-shaped recess and across the bore for precluding passage of fluid through said bore and in its raised position permitting a free passage of fluid through said bore, hydraulic fluid means cooperating with said gate member for alternate raising and lowering thereof for controlling the flow of fluid through said bore, pump means operably connected with the hydraulic fluid means for selectively directing hydraulic fluid thereto for actuation thereof, motor means operably connected with said pump means for operation thereof, remotely controlled actuating means responsive to a signal from a remote site for selective actuation of said motor means, and power supply means operably connected with said remotely controlled actuating means.

2. A remote control valve system for pipe line as set forth in claim 1 and wherein the hydraulic fluid means includes hydraulic fluid reservoir means in communication with the pump for supplying hydraulic fluid thereto and receiving hydraulic fluid therefrom.

3. A remote control valve system for pipe lines as set forth in claim 1 wherein the pump means comprises a reversible pump.

4. A remote control valve system for pipe lines as set forth in claim 1 wherein the motor means comprises a reversible motor.

5. A remote control valve system for pipe lines as set forth in claim 1 wherein the valve means comprises a valve stem secured to the gate member and operably connected with the hydraulic fluid means for reciprocation thereby to provide said reciprocal movement for said gate member.

6. A remote control valve system for pipe lines as set forth in claim 5 wherein the hydraulic fluid means comprises a hydraulic fluid chamber for receiving the valve stem therein, piston head means disposed within the hydraulic fluid chamber and secured to the valve stem, a first port member provided at one end of the hydraulic fluid chamber, a second port member provided at the opposite of the hydraulic fluid chamber, conduit means interposed between the pump and each of the ports for controlling the flow of hydraulic fluid to the hydraulic fluid chamber, said pump operable for directing the hydraulic fluid alternately to the ports for reciprocating the piston head within the hydraulic fluid chamber for selective reciprocation of the valve stem and gate member for selective opening and closing of the valve.

* * * * *